(12) United States Patent
Pan et al.

(10) Patent No.: US 9,344,900 B2
(45) Date of Patent: May 17, 2016

(54) APPARATUS AND A METHOD FOR A MOBILE RELAY STATION TRANSCEIVER AND A BASE STATION FOR A MOBILE COMMUNICATION SYSTEM

(75) Inventors: Yuwen Pan, Shanghai (CN); Qinglin Luo, Shanghai (CN); Tao Yang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 28 days.

(21) Appl. No.: 14/376,940

(22) PCT Filed: Feb. 6, 2012

(86) PCT No.: PCT/CN2012/070911
§ 371 (c)(1),
(2), (4) Date: Aug. 6, 2014

(87) PCT Pub. No.: WO2013/116980
PCT Pub. Date: Aug. 15, 2013

(65) Prior Publication Data
US 2014/0349570 A1   Nov. 27, 2014

(51) Int. Cl.
*H04B 7/15* (2006.01)
*H04W 16/26* (2009.01)
(Continued)

(52) U.S. Cl.
CPC ........... *H04W 16/26* (2013.01); *H04B 7/15507* (2013.01); *H04W 60/00* (2013.01); *H04W 84/005* (2013.01); *H04W 84/047* (2013.01); *H04W 88/04* (2013.01); *H04W 92/20* (2013.01)

(58) Field of Classification Search
CPC ... H04W 84/047; H04W 88/04; H04W 24/02; H04W 84/005; H04W 72/042; H04W 36/0083; H04W 64/00; H04W 72/04; H04W 76/02; H04W 88/08; H04W 36/0061; H04W 72/0406
USPC ............. 455/11.1, 7, 12.1, 13.1, 445, 15, 16, 455/403, 422.1, 436–444, 550.1, 455/432.1–432.3, 431, 456.1–457, 426.1, 455/426.2, 509, 450; 370/315, 310, 316, 370/277, 279, 328, 329, 338, 330
See application file for complete search history.

(56) References Cited

U.S. PATENT DOCUMENTS 8,374,629 B2    2/2013  Yin
2010/0311419 A1   12/2010  Bi
(Continued)

FOREIGN PATENT DOCUMENTS

CN    102111806 A    6/2011
CN    102118808 A    7/2011
(Continued)

OTHER PUBLICATIONS

International Search Report for PCT/CN2012/070911 dated Nov. 15, 2012.
(Continued)

*Primary Examiner* — Keith Ferguson
(74) *Attorney, Agent, or Firm* — Fay Sharpe LLP

(57) ABSTRACT

Embodiments relate to an apparatus (2) for a mobile relay station transceiver (4; 10, 12) in a mobile communication system comprising a donor interface (6) for communicating with a donor base station transceiver, the donor interface (6) being operable to submit a request for a tracking area update to the donor base station and a relay interface (8) for communicating with another apparatus for a relay station transceiver, the relay interface (8) being operable to receive tracking area information from the other apparatus for a relay station transceiver.

15 Claims, 4 Drawing Sheets

(51) Int. Cl.
  *H04W 60/00* (2009.01)
  *H04B 7/155* (2006.01)
  *H04W 88/04* (2009.01)
  *H04W 92/20* (2009.01)
  *H04W 84/04* (2009.01)
  *H04W 84/00* (2009.01)

(56) References Cited

U.S. PATENT DOCUMENTS

2012/0039246 A1* 2/2012 Zhang ................... H04W 68/02
　　　　　　　　　　　　　　　　　　　　　　370/315
2012/0238208 A1* 9/2012 Bienas ................... H04W 8/24
　　　　　　　　　　　　　　　　　　　　　　455/41.2

FOREIGN PATENT DOCUMENTS

| | | |
|---|---|---|
| CN | 101883433 A | 11/2011 |
| CN | 102244935 A | 11/2011 |
| JP | 2007-013866 | 1/2007 |
| JP | 2009-225158 | 10/2009 |
| JP | 2012-503904 | 2/2012 |
| WO | WO 2010/037321 | 4/2010 |
| WO | WO 2011/110229 A1 | 9/2011 |
| WO | WO 2011/142628 A2 | 11/2011 |

OTHER PUBLICATIONS

3GPP TSG-RAN WG3 Meeting #75, "Mobile relay architecture comparison from the perspective of TAU," R3-120027, Dresden, Germany, Feb. 6-10, 2012, 3 pages.

* cited by examiner

APPARATUS AND A METHOD FOR A MOBILE RELAY STATION TRANSCEIVER AND A BASE STATION FOR A MOBILE COMMUNICATION SYSTEM

Embodiments of the present invention relate to an apparatus and a method for a mobile relay station transceiver as well as to a base station for a mobile communication system in general, and more particularly but not exclusively to updating mechanisms for tracking area information in group mobility scenarios.

BACKGROUND

Demands for higher data rates for mobile services are steadily increasing. At the same time modern mobile communication systems as 3rd Generation Systems (3G) and 4th Generation Systems (4G) provide enhanced technologies which enable higher spectral efficiencies and allow for higher data rates and cell capacities. Wireless broadband has thus become reality in recent years. Online multimedia, gaming, mobile application downloading, etc., become dominating traffic of the mobile network.

As operators are seeking to extend the coverage of their networks, relaying concepts become more and more sophisticated. In 3rd Generation Partnership Project (3GPP) as international standardization body, relay architectures for Evolved-UMTS Terrestrial Radio Access (E-UTRA, wherein UMTS abbreviates Universal Mobile Telecommunication System) have been discussed and results collected in Technical Recommendation 36.416.

In relaying architectures a relay station transceiver may extend the coverage of a base station transceiver. Basic concepts use a relay station transceiver, which receives signals from a base station transceiver and forwards them to mobile transceivers or user equipment, and vice versa, in an amplify-and-forward fashion. The radio signals from the base station transceiver are received, amplified and transmitted to the mobile transceiver, from the relay station transceiver respectively. In such a scenario the relay station may not even be identified as such by a mobile transceiver. In other concepts, the relay station transceiver may correspond to a base station transceiver, which is connected to another base station transceiver, the so-called donor base station transceiver, via a radio interface and provides radio services as a base station to the mobile transceiver station or user equipment.

In so-called group mobility scenarios, that is in scenarios where multiple mobile transceivers or user equipment move jointly through the communications network, mobile relay stations moving together with the user equipment may be utilized in order to provide a reliable and stable service to the user equipment. This is particularly the case when multiple users move together quickly, as for example, in a high-speed train, such as the China Railways High-Speed (CRH) train between Beijing and Shanghai at speeds of up to 350 km/h. Employing mobile relay station transceivers inside the train may provide for stable operations and multiple services of good quality to the users.

SUMMARY

Embodiments of the present invention are based on the finding that a signaling overhead associated to the update of tracking area information may be further decreased when an apparatus for a mobile relay station transceiver or a mobile relay station transceiver is used having in addition to a donor interface for communicating with a donor base station transceiver a relay interface for communicating with another apparatus for a relay station transceiver, the relay interface being operable to receive tracking area information from the other apparatus for a relay station transceiver. That is, in multi-mobile relay station scenarios, multiple mobile relay stations travelling together, e.g. in a train or a bus or the like, may utilize the relay interface for sharing tracking area information associated to a common tracking area of the relay station transceivers.

While a mobile relay station transceiver handles the joint traffic of all mobile transceivers, i.e. the user equipment, to the associated donor base station transceiver, the mobile transceivers do not need to individually update their locations to a mobility managing entity, a home subscriber service or a similar entity within the mobile communication network. When the mobile relay station transceiver employed in a high-speed train moves from one donor base station transceiver to a neighboring donor base station transceiver, the tracking areas belonging to all user equipment associated with the mobile relay station transceiver may change. Shifting the tracking area update from a simultaneous tracking area update of all user equipment associated to a particular mobile relay station transceiver to the mobile relay station transceiver may already decrease the associated network load. That is, a burst of update signaling of each user equipment to the network may be avoided. Generally, a tracking area update is to be understood as the procedure initiated by any mobile transceiver moving through the network in order to update a central entity, as for example a Mobility Managing Entity (MME) or a Home Subscriber Service (HSS) with the present position of the mobile transceiver such as to allow to page the transceiver in case of an incoming data connection or an incoming call.

As compared to those scenarios with a mobile relay station transceiver embodiments of the present invention may reduce the signaling overhead caused by tracking area updates even further. These may occur even when the associated mobile base station transceivers are in idle mode that is even when they are not exchanging payload data with the network. With this respect, it may be noted that the terms "mobile communication system" and "mobile communication network" will be used synonymously herein. A mobile relay station transceiver has a coverage area, in which a mobile transceiver can be located. The mobile communication system comprises a plurality of base station transceivers and a mobile transceiver. The mobile transceiver is associated with the mobile relay station transceiver while being in an idle mode, the idle mode being a state in which data transmission is inactive. In other words, and also generally, two basic states may be distinguished for mobile transceivers being adapted for communicating in a mobile communication network. The first state, the so-called idle state, is a state in which the mobile has no active connections or data sessions with the network. In other words, there is no active data exchange between the mobile transceiver and the network. Even though no data is exchanged, the mobile transceiver is still registered with the network, enabling the network to query the mobile transceiver if a call or a data session is requested to be established with the mobile transceiver. In such a situation a mobility management entity in the network may query the mobile transceiver, the procedure of which is also referred to as "paging".

The apparatus for a mobile relay station transceiver according to some embodiments comprises a donor interface for communicating with a donor base station transceiver in order to request a tracking area update to the donor base station as well as a relay interface for communicating with another relay station transceiver in order to receive tracking area information already previously signaled to the other relay station transceiver. Since the tracking area information provided by the network, a mobility managing entity, a home subscriber server or the like will be identical for both of the mobile relay station transceivers travelling together the information may be shared among both receivers connected together via the relay interface. Thus, the downstream bandwidth to signal the tracking area information more than once to a group of connected mobile relay stations redundantly may be saved.

Tracking area information signaled downstream from a mobility managing entity of the network to the individual mobile relay station transceivers may, for example, comprise MME identity information uniquely identifying the mobility management entity coordinating the mobility of the transceivers present in the tracking area associated to a particular MME. Furthermore, the tracking area information may be related to a group or a unique identification for a group of donor base stations or base stations belonging to the particular tracking area. A further possibility of tracking area information may comprise a list of donor base stations belonging to the tracking area or a list of unique IDs assigned to the respective donor base stations. The tracking area information may furthermore comprise any other type of information signaling or flag allowing to uniquely identify a particular tracking area within the mobile communication system. The tracking area information may also contain a Tracking Area Information list (TAI list) which is, generally speaking, a list of Tracking Areas (TA).

As the above considerations have shown, embodiments of apparatuses for mobile relay station transceivers may help to further decrease the signaling information overhead in the core network in the event of a tracking area change occurring when the associated mobile relay station transceiver transits from one tracking area to a new tracking area not stored in its present TAI list. This may be associated with a transit from the coverage of a donor base station transceiver belonging to a first tracking area to a donor base station transceiver belonging to a different or new, second tracking area, which is not contained in the present TAI list of the mobile relay station transceiver. This typically makes the mobile relay station transceiver initiate a request for a tracking area update to become associated to the new tracking area.

According to further embodiments the donor interface of an apparatus for a mobile relay station transceiver is further operable to receive tracking area information from the donor base station. That is, an apparatus according to those embodiments may, on the one hand, be implemented in a mobile relay station transceiver receiving the tracking area information from another mobile relay station transceiver or, on the other hand, receive the tracking area information from the core network or the donor base station via the donor interface such as to be able to distribute the information to other mobile relay station transceivers.

To this end, some embodiments implement relay interfaces which are further operable to transmit tracking area information to other relay station transceivers. According to some embodiments, the submission of the tracking area information from a first to a second mobile relay station transceiver may be performed on a broadcast basis or on an on-demand basis. In order to enable an apparatus for a mobile relay station transceiver to request tracking area information from another mobile relay station transceiver, some embodiments implement relay interfaces which are operable to transmit a request for tracking area information. This may serve to save further bandwidth in the inter-relay station transceiver communication by avoiding subsequent broadcasting.

The relay interface may be a wired or a wireless interface. Utilizing a wireless interface may enable the re-use of already existing wireless transmitters to signal the additional information such as to be able to save additional hardware costs. According to some embodiments the apparatus for a mobile relay station transceiver discussed in the previous paragraphs is an additional circuitry, apparatus or logic coupled to a conventional mobile relay station, particularly to its wireless interface for communicating with a donor base station (subsequently also called donor eNodeB or DeNB) to provide for the additional functionality. According to further embodiments, a mobile relay station transceiver implements such an apparatus and hence the new functionality in its hardware, software or the like.

Such an embodiment of a mobile relay station transceiver may comprise an air interface operable to communicate wirelessly with user equipment such as to forward the traffic from the core network or the donor base station to the user equipment associated to the mobile relay station transceiver and vice versa.

According to some embodiments two mobile relay station transceivers forming a communication system travelling together, e.g. in a means of mass transportation, transmit the request for a tracking area update individually, when entering an area covered by a donor base station associated to a new tracking area not contained within their TAI list. That is, the first mobile relay station transceiver submits a request for a tracking area update to the donor base station via its donor interface when entering the same new tracking area and the second mobile relay station transceiver submits a request for a tracking area update to the donor base station when entering into the new tracking area afterwards.

According to further embodiments, however, only the first mobile relay station transceiver entering into the new tracking area submits the request for the tracking area update via its donor interface after associating himself with a new base station while the new base station submits the request for a tracking area update on behalf of the second mobile relay station transceiver once the second mobile relay station transceiver is associated to the new base station. This may serve to further save signaling bandwidth between mobile relay station transceivers and associated donor base stations, that is upstream bandwidth. Therefore, some embodiments of the invention comprise a base station for a mobile communication system comprising a wireless interface operable to communicate as a donor base station with a donor interface of an associated mobile relay station transceiver as well as a network interface for communicating with a mobility managing entity. The network interface is operable to submit a request for a tracking area update on behalf of a mobile relay station transceiver upon association with the particular mobile relay station transceiver through the wireless interface.

Some embodiments comprise a digital control circuit installed within the apparatus for performing the method. Such a digital control circuit, e.g. a digital signal processor (DSP), needs to be programmed accordingly. Hence, yet further embodiments also provide a computer program having a program code for performing embodiments of the method, when the computer program is executed on a computer or a digital processor.

BRIEF DESCRIPTION OF THE FIGURES

Some embodiments of apparatuses and/or methods will be described in the following by way of example only, and with reference to the accompanying figures, in which.

DESCRIPTION OF EMBODIMENTS

Various embodiments will now be described in more detail with reference to the accompanying drawings. In the figures, the thicknesses of lines, layers and/or regions may be exaggerated for clarity.

Accordingly, while embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
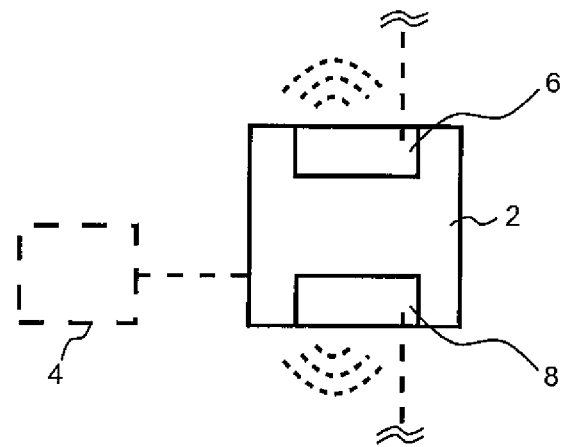
FIG. 1 shows an embodiment of an apparatus for a mobile relay station transceiver.

FIG. 1 shows an embodiment of an apparatus 2 for a mobile relay station transceiver 4 in a mobile communication system. The apparatus 2 may be an independent apparatus, hardware or the like which is coupled to a mobile relay station transceiver 4 as indicated in FIG. 1. FIG. 1 shows the optional mobile relay station transceiver 4 in dashed lines for illustrative purposes only. However, according to further embodiments, the apparatus for a mobile relay station transceiver may be integrated into a mobile relay station transceiver, implemented in its software or implemented as an additional hardware within a housing of the mobile relay station transceiver.

The apparatus 2 comprises a donor interface 6 for communicating with a donor base station transceiver as well as a relay interface 8 for communicating with another relay station transceiver or with a further apparatus for a mobile relay station transceiver. The donor interface 6 is operable to submit a request for a tracking area update to the donor base station presently associated to the apparatus. As indicated in FIG. 1, the donor interface 6 may utilize wireless or wired technologies in order to communicate with the donor base station transceiver. Also, the relay interface 8 may communicate using any wired or wireless transportation medium, protocol, or the like. The donor interface 6 is operable to submit a request for a tracking area update to the associated donor base station when necessary, i.e. typically when the associated mobile relay station transceiver enters into a new tracking area of the network to which it is not assigned already. This may be determined by the apparatus 2 by comparing a locally stored list of tracking areas, the TAI list, with the new tracking area. The relay interface 8 is operable to receive tracking area information from another apparatus for a relay station transceiver coupled to the relay interface 8 such as to avoid unnecessary down-link traffic for signaling purposes. The tracking area information may, for example, contain a new or updated Tracking Area Information list (TAI list) which is, generally speaking, a list of Tracking Areas (TA).

It goes without saying that also the coupling between the mobile relay station transceiver 4 and the apparatus 2 may be implemented using any known wireless or wired technology. For example, the apparatus 2 may be coupled to a conventional mobile relay station transceiver 4 using the wireless interface which is also used for the communication between the conventional mobile relay station transceiver and a donor base station such as to be able to upgrade existing conventional mobile relay station transceivers with the new functionality by using an apparatus 2 according to an embodiment of the present invention.

Figure 2:
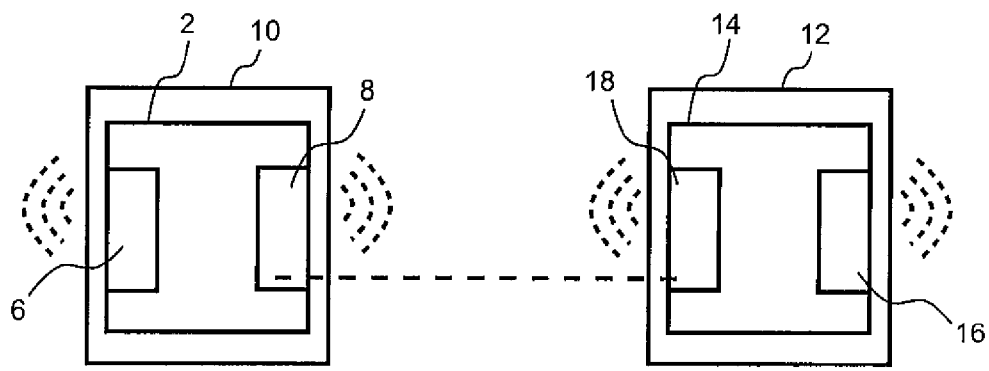
FIG. 2 shows a communication system comprising a first and a second mobile relay station transceiver.

FIG. 2 shows a communication system comprising a first mobile relay station transceiver 10 incorporating an apparatus for a mobile relay station transceiver 2 as well as a second mobile relay station transceiver 12 incorporating an apparatus 14 for a mobile relay station transceiver. The apparatus 14 comprises a donor interface 16 and a relay interface 18. The functionality of the donor interfaces and the relay interfaces have already been elaborated on in the preceding paragraphs with respect to the apparatus 2 for the mobile relay station transceiver 4 of FIG. 1.

The first and second mobile relay station transceivers 10 and 12 are coupled by their respective relay interfaces 8 and 18 such as to be able to communicate with each other. When the communication system illustrated in FIG. 2 travels together, it will jointly enter into a new tracking area of the mobile communication system, although at slightly different times. For the following consideration, it is assumed that the first mobile relay station transceiver 10 enters into the new tracking area first. In this event, the first mobile relay station transceiver 10 submits a request for a tracking area update via its donor interface 6 to a new base station belonging to the new tracking area when necessary, that is when the new tracking area does not belong to its TAI list. After the tracking area update has been performed by the mobile communications network, for example by a MME or a HSS in the network, tracking area information associated to the new tracking area is submitted by the network, i.e. by the MME, the HSS or the new donor base station to the first mobile relay station transceiver 10 which receives the information via the donor interface 6.

When the second mobile relay station transceiver 12 enters the new tracking area shortly after, it submits a request for a tracking area update to the donor base station as well, using its associated donor interface 16. Once also the second mobile relay station transceiver 12 has been updated to belong to the new tracking area, the identical new tracking area information does not need be resent downstream since the second mobile relay station transceiver 12 may receive the tracking area information from the first mobile relay station transceiver 10 via the relay interface 18. That is, the first mobile relay station transceiver 10 sends the previously-received tracking area information via its relay interface 8 to the second mobile relay station transceiver 12 receiving the information via its associated relay interface 18.

That is, according to some embodiments, the relay interface is operable to transmit tracking area information as well as to receive tracking area information. The tracking area information may either be submitted automatically from the first to the second mobile relay station transceiver 10, 12 or the second mobile relay station receiver 12 may request the sending of the information by an associated message. To this end, the second mobile relay station transceiver 12 may transmit a request for tracking area information via its relay interface 18 to the first mobile relay station transceiver 10. According to some embodiments, the sending of this request may be a triggered by an acknowledgement signal received by the second mobile rely station transceiver 12 via its donor interface 16, wherein the acknowledgement signal indicates a successfully performed tracking area update by the network, e.g. by an MME or an HSS.

Tracking area information submitted by the network may, for example, be MME identity information or a list of donor base stations (also referred to as TAI list herein) forming the new tracking area or both sets of information altogether. To this end, the mobile relay stations 10 and 12 may, for example, learn about the necessity to initiate a tracking area update by comparing a locally stored list of tracking areas with the new tracking area of the new donor base station. Once the new tracking area is not contained within the list, the mobile relay station transceiver may conclude that a tracking area update shall be initiated by the mobile relay station transceiver. However, it goes without saying, that any further method may be implemented such as to enable the mobile relay station transceiver to decide whether a tracking area update is required or not.

Figure 3:
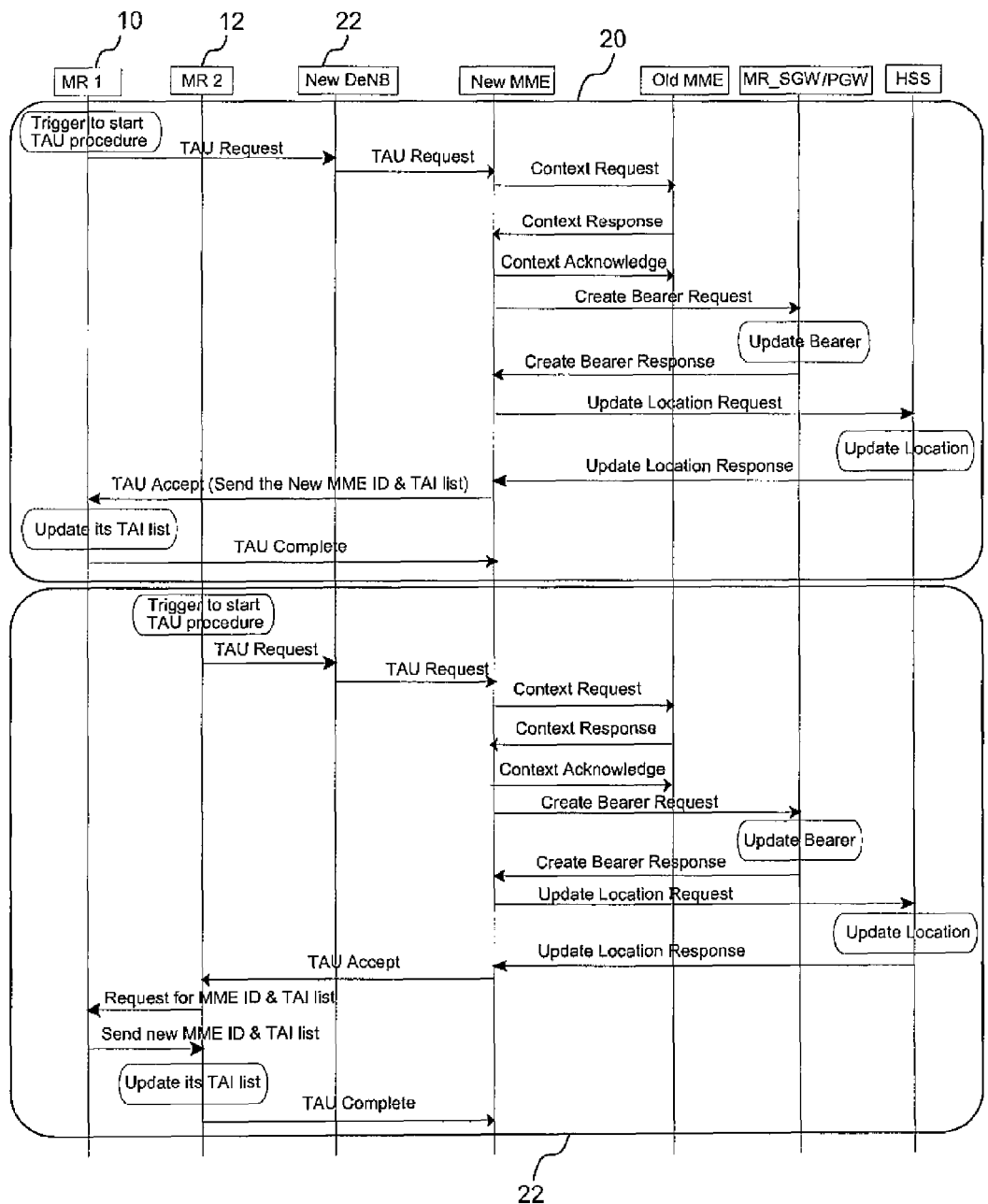
FIG. 3 shows an example of a flow of control messages exchanged by embodiments of a mobile relay station transceiver.

FIG. 3 illustrates one possible implementation of a flow of protocol messages between a first and a second mobile relay station transceiver and components of the core network such as to implement an embodiment of the present invention.

While a first message flow 20 in order to perform a tracking area update for the first mobile relay station transceiver 10 may correspond to a conventional approach, the second message flow 22 in order to perform a tracking area update for the second mobile relay station transceiver 12 is different, as it will be elaborated on in the following paragraphs. In the following, the individual messages exchanged within an exemplary network configuration are discussed from top to bottom, i.e. in the timely order of their appearance within the mobile communications network.

Upon an arbitrary trigger condition to start the Traffic Area Update (TAU) procedure, the first mobile relay station transceiver 10 initiates the TAU procedure by submitting a request for a tracking area update to the new donor base station transceiver 22 to which it has been associated, i.e. which is able to service the moving mobile relay station transceiver 10 at present. Once received by the donor base station transceiver 22, the tracking area update request is forwarded to the new Mobility Managing Entity (new MME) which is in charge of managing the mobility of all mobile transceivers or user equipment associated to the new donor base station 22.

The new MME issues a context request to an old MME which was responsible for the mobility management of the first mobile relay station transceiver 10 before its association to the new donor base station 22. As a response to the context request, the old MME forwards context information associated to the first mobile relay station transceiver 10 to the new MME. The context information may, for example, be related to the transmission capabilities of the transceiver 10 in terms of bandwidth, previously-used radio bearers or the like. Safe receipt of the context information is acknowledged to the old MME by the new MME. Once the new MME is in receipt of the context information it is prepared to create a bearer request for a Serving GateWay (SGW) and a Packed Data Network (PDN) Gateway (PGW) in order to create a radio bearer for the mobile relay station transceiver 10, that is, to assign radio resources used to transmit payload to the mobile relay station transceiver 10.

For example, the new MME may be a key control-node for a Long Term Evolution (LTE) access-network. It is responsible for idle mode UE (User Equipment) tracking and paging procedure including retransmissions. It is involved in the bearer activation/deactivation process and is also responsible for choosing the SGW for a UE at the initial attach and at time of intra-LTE handover. The SGW may, for example, route and forward user data packets, and may also act as a mobility anchor for the user plane during inter-eNodeB or DeNB handovers. The PDN gateway may provide connectivity from the UE or the mobile relay station transceivers to external packet data networks by being the point of exit and entry of traffic for the UE.

Once the new MME has assigned resources to communicate payload to the mobile relay station transceiver 10, it sends an update location request to the home subscriber server indicating that the mobile relay station transceiver 10 is now reachable via new MME such as to enable the home subscriber server to store this information into its data base. To this end, a HSS may be a central database that contains user-related and subscription-related information. The functions of the HSS may include functionalities such as mobility management, call and session establishment support, user authentication and access authorization. The successful location update is acknowledged to the new MME which, in turn, sends an acknowledgement signal (TAU accept) to the mobile relay station transceiver 10 to indicate that the tracking area update has been successfully performed by the respective network components.

According to the particular embodiment shown in FIG. 3, the tracking area information sent together with the acknowledgement signal includes MME identity information being uniquely identifying the new MME as well as a Tracking Area Information list comprising a list of donor base stations building the new tracking area under control of the new MME. The mobile relay station transceiver 10 stores this information in its associated memory and acknowledges the successful update of the TAI list to the new MME thus finishing the procedure of the tracking area update and the associated message flow 20 for the first mobile relay station transceiver 10.

Most parts of the second message flow 22 for the tracking area update for the second mobile relay station transceiver 12 correspond to the first message flow 20. Therefore, a repetition of the individual messages shall, for the ease of understanding, be omitted. The message flow starts on occurrence of a trigger condition at the second mobile relay station transceiver 12. However, the message flow differs from the first message flow 20 in that the tracking area update accept message "TAU accept" sent by the new MME comprises only an acknowledgement signal indicating a successful tracking area update by the core network and omits the tracking area information. Once the second mobile relay station transceiver 12 is in receipt of the acknowledgement information it transmits a request for tracking area information to the first relay station transceiver 10 using its relay interface 18. In response to the request, the first mobile relay station transceiver 10 submits the MME identity information and the tracking area information list to the second mobile relay station transceiver 12 via the relay interface 8 such as to save signaling bandwidth downstream from the MME to the second mobile relay station transceiver 12.

Figure 4:
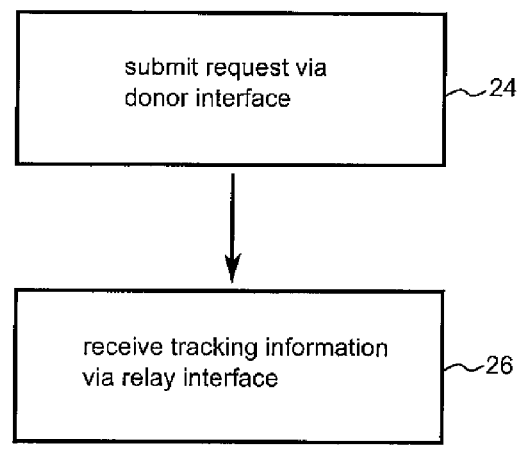
FIG. 4 shows a flow-chart of a method for updating tracking area information of a mobile relay station transceiver.

FIG. 4 shows a block diagram illustrating a method for updating tracking area information of a mobile relay station transceiver according to an embodiment of the present invention. In a submission step 24, a request for a tracking area update is submitted to a donor base station via a donor interface and in a receiving step 26 tracking area information is received from another relay station transceiver via a relay interface.

Figure 5:
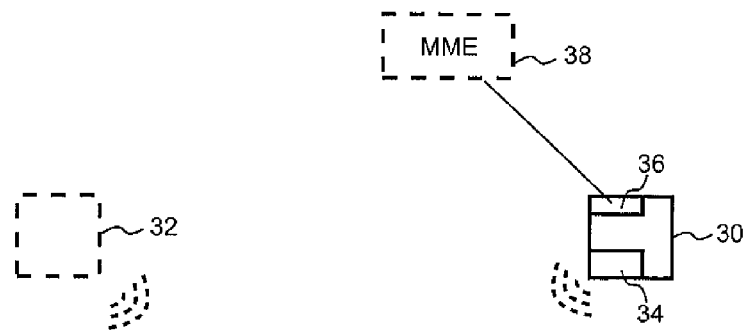
FIG. 5 shows an embodiment of a communication system comprising two mobile relay station transceivers and an associated base station.
Figure 5:
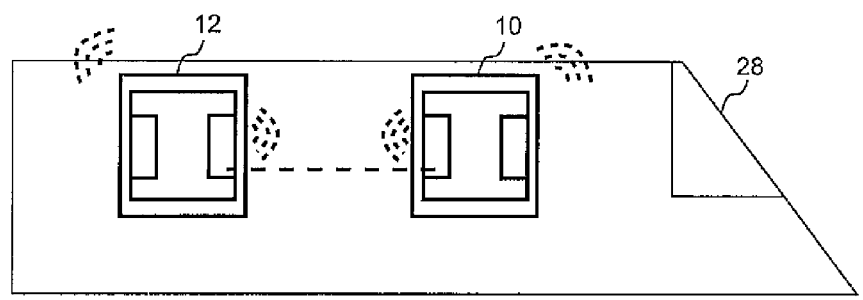

FIG. 5 illustrates an embodiment of a communication system of FIG. 2 within a means for mass transportation 28, e.g. within a high-speed train illustrated schematically in FIG. 5. The communication system illustrated in FIG. 5 further comprises a donor base station 30 capable of serving as a donor base station for the first and second mobile relay station transceivers 10 and 12. In the following, it is assumed that a tracking area update is required when the first and second mobile relay station transceivers 10 and 12 transit from a previously-used donor base station 32, which is only shown herein for illustrative purposes, to the donor base station 30. The donor base station 30 comprises a wireless interface 34 operable to communicate, as a donor base station, with the donor interfaces of the mobile relay stations 10 and 12 as well as a network interface for communicating with a mobility managing entity 38 in a core network, which is also shown for illustrative purposes only. To further reduce upstream traffic between the wireless interface of the base station 34 and the donor interface 16 of the second mobile relay station transceiver 12, the network interface 36 of the base station 30 is operable to submit the request for a tracking area update on behalf of the second mobile relay station transceiver 12 upon association of the second mobile relay station transceiver with the donor base station 30. That is, after the first mobile relay station transceiver 10 has already performed a tracking area update as elaborated in FIGS. 1 to 3, the donor base station 30 initiates the tracking area update for the second mobile relay station transceiver 12 once it is associated to the donor base station 30.

Association can, according to one embodiment, mean the successful performing of a handover from the previous donor base station 32 to the donor base station 30. However, according to further embodiments, the transition of the second mobile relay station 12 from the previous base station 32 to the base station 30 need not necessarily be performed in a (RRC-) connected state, that is, in a state where payload data is exchanged between the second mobile relay station transceiver 12 and any of the donor base stations 30 or 32. Association is therefore understood to be any way of establishing a connection between a mobile relay station transceiver or a User Equipment (UE) and a base station which principally enables the mobile relay station transceiver or the user equipment to exchange data via the associated base station.

By submitting the request for a tracking area update on behalf of the second mobile relay station transceiver 12, additional uplink bandwidth may be saved, while the downstream signaling may be performed according to the embodiments discussed with respect to FIGS. 1 to 4 in the previous paragraphs.

It goes without saying that, although a train is illustrated as an example for a means for mass transportation 28, further communication systems may be implemented in any other means for mass transportation such as for example a bus, an airplane, a ship or the like.

Figure 6:
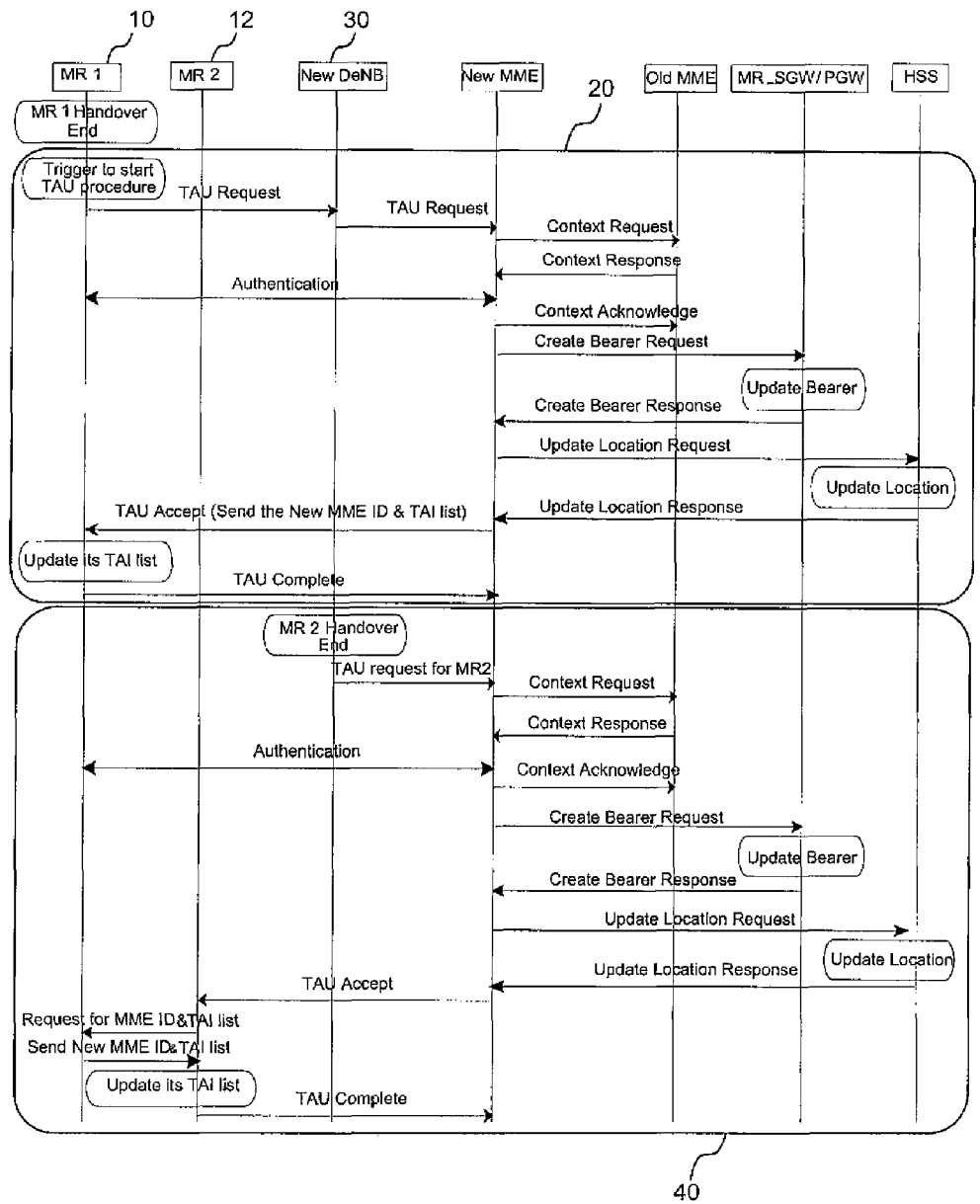
FIG. 6 shows an example of a possible flow of control messages exchanged by the system of FIG. 5.

FIG. 6 illustrates a message flow of a possible implementation of the tracking area update procedure illustrated in FIG. 5. While the first message flow 20 for the tracking area update procedure of the first mobile relay station transceiver 10 is identical to the one discussed with respect to FIG. 3, a third message flow 40 associated to the update procedure of the second mobile relay station transceiver 12 differs. Therefore, only the differences with respect to the first message flow 20 shall be discussed shortly in the following paragraph. The difference with respect to the previously-discussed embodiments is that a tracking area update request for the second mobile relay station transceiver 12 is initiated and sent by the new donor base station 30 on behalf of the second mobile relay station transceiver 12 in order to save the required uplink bandwidth. Although it is indicated in FIG. 6 that the trigger condition initiating the TAU request on behalf of the second base station transceiver 12 is the finishing of a successful handover, any other trigger condition may be implemented in further embodiments. That is, mobile relay base station transceivers 10 and 12 implementing the concept discussed herein do not necessarily have to be permanently in a connected state with the new donor base station 30, that is in a state allowing to transfer payload data.

Summarizing the above in other words, when a Mobile Relay station transceiver (MR) is employed on a high speed train and moves from one DeNB toward another DeNB, the Tracking Areas belonging to UEs camped on this MR may be different. Usually a large number of UEs on the train perform the Tracking Area Update procedures together to renew the tracking area information, which will cause a burst of update signaling to the network. A way of handling such group mobility scenarios is investigated in order to avoid the burst of update signaling. The following disclosure presents a method of update tracking area in multiple mobile relays scenario.

Some ideas on TAU for mobile relay scenario are presently discussed at a concept stage. One option is to let the MR and the UEs camped on this MR configure a list of TAs that does not require them to give any TAU, as long as the MR passes the pre-configured TAI list. However when the travelling route of the high speed train is long, for example the route from Beijing to Shanghai is about 1400 km, it is impossible to require the MMEs to do paging message for a UE to all the DeNB along the route. Another more advanced way is to let the UEs camping on the MR keep a static TAI list, and the MR is configured normally a short list of TAI. When the MR detects a new TA that is not in its TAI list, it performs the TAU procedure.

A TAU method, which can be adopted into the high speed train with multiple mobile relays scenario may be based on the following aspects.

1. When the high speed train is moving fast along the trajectory, the basic idea is to let the UEs served by the MR keep a static TAI list controlled by the MR. When UEs move from one carriage to another, they will not perform any TAU. When the train crosses TA then only the MR performs TAU procedure.

2. The scenario that there is more than one mobile relay employed on the high speed train is considered. Each MR has a limited coverage area, and serves a group of UEs in its coverage area. When the train is travelling along the trajectory, once MR detects it has entered in a new TA that is not in its stored TAI list, the MR will trigger to start a TAU procedure.

The basic idea of cooperative TAU procedure is to let multiple MRs on the train share the TAI list information. Once the first MR on the train enters in the TA controlled by a new MME, it will request to do TAU with the new MME. Since the train is always moving in one direction, for example from Beijing to Shanghai, the other MRs will always enter in the same TA in sequence. Therefore the new MME identify and new TAI list can be shared among MRs on the same train. The TAU complete signal to the MRs (apart from the first MR) does not need to include the new MME identity and new TAI list. This information is updated among MRs via reliable communication link. By doing this, the signaling cost and failure rate are reduced.

The following illustrates the concept as an example with a high speed train moving with a fast speed along the route. It is undesirable for UEs on the train to update their tracking lists frequently. Instead, L3 relay can perform group mobility for UEs. The basic idea is to let the UEs keep a static TAI list containing all the MR cells. When UEs move from one carriage to another on the train, they do not need to perform any tracking area update. MR's perform TAU in coordination. When the high speed train is moving along the trajectory, each MR needs to update its TAI list. When all MRs are, for example, always in active mode and always update to the same MME, the TAU procedure can be cooperatively performed among the MRs. A cooperative TAU procedure may enable this coordination. Once the train enters in the TA controlled by a new MME, MR will perform TAU procedure. The first MR sends the TAU request to the new MME, together with RRC parameters indicating the old MME identity (may also include its serving UE ID). The new MME retrieves context information about the first MR from the old MME previously serving the MR. It then sends request to MR SGW and PDN gateway (PGW) to create bearer. After the bearer has been created and location information has been updated successfully, the new MME sends TAU accept to the MR, including an identify associated with the new MME. The first MR will update with the new identity, and send complete signal to the new MME.

When the second MR on the high speed train enters in the TA of the new MME, it will trigger to start the TAU. The second MR sends the TAU request to the new MME, together with RRC parameters indicating the old MME identity (may also include its serving UE ID). The new MME retrieves context information of the second MR from the old MME previously serving the MR. Then it will send a create bearer request to MR SGW and PGW. Once the bearer with the new MME has been created, and location has been updated, the new MME sends TAU accept to the second MR. This signaling process differs from the conventional process, as it does not include any MME identity or TAI list. To get the corresponding MME identify and new TAI list, the second MR will send request to the first MR, because the first MR stores the new MME identify and new TAI list. After the second MR successfully updates with the new TAI list, it will send a TAU complete signal to the new MME. If there are more MRs, i.e. the third MR or the fourth MR, their TAU procedures follow the same process with the second MR. By moving the transmission of the MME identify and TAI list information from the access link between MME and MR, to the reliable communication channel between MRs, the message delivery success rate is increased.

The benefits of adopting the proposed tracking area update for mobile relays in high speed train scenario may be the following. For example in 3GPP LTE conventional TAU procedure, once a high speed train moves to a tracking area covered by a new MME, each UE performs TAU. This is very likely to cause a burst of update signaling, and thus raise instability to the system. By keeping a static TAI list within the train, this problem can be avoided. When more than one mobile relay is employed, the new MME identity and TAI list can be shared among MRs. Assuming reliable communication link is available between MRs, the TAI list is requested and transmitted between the MRs instead of via the wireless access link between the MME and the MR. In this case, the signaling cost is reduced, and the failure rate of this transmission is reduced correspondingly.

The above provides a feasible methodology to perform group mobility by multiple mobile relays. By exploiting the reliable communication between multiple mobile relays on the train, our innovative TAU procedure can alleviate the burst of update signal, and reduce the signaling cost and latency compared with conventional TAU procedure, and therefore efficiently improves the UE quality of service.

In a scenario where the MRs are always in RRC_CONNECTED mode to relay data for their serving UEs MME relocation occurs along with each MR performing handover procedure with the DeNB, so that the MR needs to obtain the new MME identity and most likely a new TA list. The basic idea of a cooperative TAU procedure is to let multiple MRs on the train share the TAI list information. Once the first MR on the train enters in the TA of a new MME, it will request to do TAU with the new MME. Since the train is always moving in one direction, for example from Beijing to Shanghai, the other MRs will always enter in the same TA in sequence. Therefore the first MR is able to notify the newly updated TAI list to other MRs on the same train. The TAU request may then be initiated by the target DeNB once its finishes the handover procedure for the second MR. In this case, the signaling cost and delay of TAU request which is initiated by MR is eliminated The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing a certain function, respectively. Hence, a "means for s.th." may as well be understood as a "means being adapted or suited for s.th.".

A means being adapted for performing a certain function does, hence, not imply that such means necessarily is performing said function (at a given time instant).

Functions of various elements shown in the figures, including any functional blocks may be provided through the use of dedicated hardware, as e.g. a processor, as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons. Furthermore, in some embodiments a single step may include or may be broken into multiple sub steps. Such sub steps may be included and part of the disclosure of this single step unless explicitly excluded.

What is claimed is:

1. An apparatus for a mobile relay station transceiver in a mobile communication system, comprising:
    a donor interface for communicating with a donor base station transceiver, the donor interface being operable to submit a request for a tracking area update to the donor base station; and
    a relay interface for communicating with another apparatus for a relay station transceiver, the relay interface being operable to receive tracking area information from the other apparatus for a relay station transceiver.

2. The apparatus according to claim 1, wherein the donor interface is further operable to receive the tracking area information from the donor base station.

3. The apparatus according to claim 1, wherein the relay interface is further operable to transmit tracking area information to the other apparatus for a relay station transceiver.

4. The apparatus according to claim 1, wherein the relay interface is further operable to transmit a request for tracking area information to the other apparatus for a relay station transceiver.

5. The apparatus according to claim 4, wherein the relay interface is operable to transmit the request upon receipt of an acknowledgement signal at the donor interface from the donor base station, the acknowledgement signal being indicative of a successfully performed tracking area update.

6. The apparatus according to claim 1, wherein the tracking area information comprises at least one of the group of a MME identity information and a list of donor base stations.

7. The apparatus according to claim 1, wherein the relay interface is a wireless interface.

8. A mobile relay station transceiver for a mobile communication system, comprising an apparatus according to claim 1 and an air interface operable to communicate wirelessly with a user equipment.

9. A communication system comprising a first mobile relay station transceiver and a second mobile relay station transceiver according to claim 8, the first and second mobile relay station transceivers being operable to communicate via their respective relay interfaces.

10. The communication system according to claim 9, wherein the second mobile relay station transceiver is operable to submit the request for the tracking area update via its donor interface and to receive the associated tracking area information from the first mobile relay station transceiver via its relay interface.

11. Means of mass transportation comprising the communication system according to claim 10.

12. The communication system according to claim 9, further comprising a base station comprising a wireless interface operable to communicate, as a donor base station transceiver, with a donor interface of an associated mobile relay station transceiver; and a network interface for communicating with a Mobility Managing Entity, wherein the network interface is operable to submit a request for a tracking area update on behalf of the mobile relay station transceiver upon association with the mobile relay station transceiver through the wireless interface, wherein the first mobile relay station transceiver submits its request for the tracking area update via its donor interface while the base station submits the request for the tracking area update on behalf of the second mobile relay station.

13. A base station for a mobile communication system comprising:
    a wireless interface operable to communicate, as a donor base station transceiver, with a donor interface of an associated mobile relay station transceiver according to claim 8; and
    a network interface for communicating with a Mobility Managing Entity, wherein the network interface is operable to submit a request for a tracking area update on behalf of the mobile relay station transceiver upon association with the mobile relay station transceiver through the wireless interface.

14. A method for updating tracking area information of a mobile relay station transceiver in a mobile communication system, the method comprising:

submitting a request for a tracking area update to a donor base station via a donor interface; and receiving tracking area information from another relay station transceiver via a relay interface.

15. A non-transitory computer readable medium including a computer program having a program code for performing the method of claim 14, when the computer program is executed on a computer or processor.

* * * * *